(12) United States Patent
Youn et al.

(10) Patent No.: US 6,831,424 B2
(45) Date of Patent: Dec. 14, 2004

(54) LIGHT SOURCE DEVICE OF A LIQUID CRYSTAL DISPLAY

(75) Inventors: Sang-Hyuck Youn, Seoul (KR); Seok-Won Lee, Suwon-si (KR); Jeong-Hwan Lee, Suwon-si (KR)

(73) Assignee: Samsung Electronics, Co., LTD, Kyungki-Do (KR)

( * ) Notice: Subject to any disclaimer, the term of this patent is extended or adjusted under 35 U.S.C. 154(b) by 192 days.

(21) Appl. No.: 09/976,125

(22) Filed: Oct. 12, 2001

(65) Prior Publication Data

US 2003/0015966 A1 Jan. 23, 2003

(30) Foreign Application Priority Data

May 30, 2001 (KR) ........................................ 2001-29912

(51) Int. Cl.[7] .............................................. H05B 41/16
(52) U.S. Cl. .................................................... 315/248
(58) Field of Search .......................... 315/248; 174/27, 174/23 R, 116

(56) References Cited

U.S. PATENT DOCUMENTS

| | | | | |
|---|---|---|---|---|
| 4,319,074 A | * | 3/1982 | Yaste et al. | 174/116 |
| 5,457,285 A | * | 10/1995 | Faust et al. | 174/23 R |
| 6,066,799 A | * | 5/2000 | Nugent | 174/27 |
| 6,313,587 B1 | * | 11/2001 | MacLennan et al. | 315/248 |

* cited by examiner

*Primary Examiner*—John F. Niebling
*Assistant Examiner*—Andre' Stevenson
(74) *Attorney, Agent, or Firm*—F. Chau & Associates, LLC

(57) ABSTRACT

Disclosed is a light source device capable of minimizing leakage of power supplied to a lamp of a liquid crystal display device. A plurality of power supply lines is extended between the lamp for generating light and an inverting board for receiving the power source from the outside to supply power to the lamp. The plurality of the power supply lines is coated with a shrinkable tube to be spaced apart from one another. Accordingly, the leakage of the power source that is generated from the first, second, third and fourth power supply lines due to a coupling phenomenon thereof is minimized.

8 Claims, 16 Drawing Sheets

LIGHT SOURCE DEVICE OF A LIQUID CRYSTAL DISPLAY

BACKGROUND OF THE INVENTION

1. Field of the Invention

The present invention relates to a liquid crystal display device, and more particularly, a light source device of a liquid crystal display device capable of minimizing leakage of power.

2. Description of the Related Art

As compared to Cathode Ray Tube (CRT) displays, liquid crystal display devices are lighter in weight, smaller in size, and provide full color and high resolution. As a result, many users prefer a liquid crystal display device over a CRT, for example, for use as a monitor of a computer or a household television that is hung on a wall, and the like.

Generally, when an electric field or an electric charge is applied to liquid crystal molecules, the liquid crystals become twisted, untwisted, or straightened in a predictable manner depending on the level of electric charge applied. The changing molecule pattern in the liquid crystals can be used to alter the optical characteristics of light passing through the crystals, such as blocking, passing, or partially passing the light. Therefore, the liquid crystal display device can display variations in images by controlling the liquid crystal cells.

FIG. 1 is an exploded perspective view showing a conventional liquid crystal display device and FIG. 2 shows the constructions of a lamp adapted to a lamp unit shown in FIG. 1.

Referring to FIG. 1, the liquid crystal display device 100 has a liquid crystal display module 130 for displaying an image when image signals are applied thereto and a front case 110 and a rear case 120 for receiving the liquid crystal display module 130. The liquid crystal display module 130 includes a display unit 170 having a liquid crystal display panel 171 for displaying the image and a backlight assembly 150 for providing light to the display unit 170.

The display unit 170 includes the liquid crystal display panel 171, a data printed circuit board 176, a gate printed circuit board 175, a data tape carrier package 178 and a gate tape carrier package 174.

The liquid crystal display panel 171 includes a thin film transistor substrate 172 and a color filter substrate 173.

The thin film transistor substrate 172 is a transparent glass substrate on which thin film transistors are formed in a matrix. Data lines are connected to source terminals and gate lines are connected to gate terminals of the thin film transistors. Furthermore, pixel electrodes made of transparent and conductive material, such as Indium Tin Oxide (ITO), are connected to drain terminals of the thin film transistors.

The color filter substrate 173, disposed against the thin film transistor substrate 172, provides color to the image viewed. The color filter substrate 173 has red, green, and blue (RGB) pixels, typically formed by a thin film process, to present desired colors when light passes through the color filter substrate 173. A surface of the color filter substrate 173 is covered with common electrodes made of ITO.

The thin film transistors of the thin film transistor substrate 172 correspond to the pixels of the display. They are selectively turned on and off to apply desired voltages to corresponding liquid crystals to change their orientations to pass or block the passage of light.

Control signals such as driving signals and timing signals are applied to the gate lines and data lines of the thin film transistors to control the amount of voltage applied at specified times to the liquid crystals in the liquid crystal display panel 171 to control the level of brightness affecting each pixel.

Image signals representing images to be displayed are received at the data printed circuit board 176 and the gate printed circuit board 175, which apply driving signals to the data lines and the gate lines of the TFT substrate 172 in liquid crystal display panel 171. The data printed circuit board 176 is connected to the data tape carrier package 178 for controlling the data line and the gate printed circuit board 175 is connected to the gate tape carrier package 174 for controlling the gate line in the liquid crystal display panel 171. A source portion is formed on the data printed circuit board 176 to receive the image signals from an information process device such as a computer, etc. and then to provide a data driving signal to the data line of the liquid crystal display panel 171. A gate portion is formed on the gate printed circuit board 175 to provide a gate driving signal for the gate line of the liquid crystal display panel 171. That is, the data printed circuit board 176 and the gate printed circuit board 175 generate the gate driving signal and the data signal for driving the liquid crystal display device and the plural timing signals for applying the gate driving signal and the data signal at a proper time, so as to apply the gate driving signal through the gate tape carrier package 174 to the gate line of the liquid crystal display panel 171 and the data signal through the data tape carrier package 178 to the data line of the liquid crystal display panel 171.

The backlight assembly 150 is disposed under the display unit 170 to supply light to the display unit 170 uniformly. The backlight assembly 150 includes lamp units 161 and 162 as light source. They are disposed at two ends of the liquid crystal display module 130. A light guide plate 152 guides the light to the display unit 170. A plurality of optical sheets 153 act to redirect and scatter evenly the light emitted from the light guide plate 152. A reflective plate 154 disposed under the light guide plate 152 reflects the light leaked from the light guide plate 152 toward the display unit 170.

The display unit 170 and the backlight assembly 150 are received in a mold frame 132, which is provided with a top chassis 140 for preventing the display unit 170 from separating from the mold frame 132.

Meanwhile, the liquid crystal display device has a bottom chassis 133 for shielding the display unit from electromagnetic waves. The bottom chassis 133 contains a printed circuit board (not shown, referred to as an inverter) including an inverter circuit to supply electricity to lamps of the lamp units 161 and 162.

The front case 110 is combined with the rear case 120 so that the mold frame 132 is placed between the front case 110 and the rear case 120, when the assembly of the liquid crystal display device is complete.

Referring to FIG. 2, the lamp units 161 and 162 respectively include a cold cathode tube 161a as a lamp, first and second power supply lines 163 and 164 for providing electric bias to the cold cathode tube 161a. Lamp holders 161b and 161c are used for positioning the cold cathode tube 161a. The first power supply line 163 applies a high voltage to the cold cathode tube 161a and the second power supply line 164 applies a low voltage to the cold cathode tube 161a. The first and second power lines 163 and 164 are connected to a connector 165 to receive an electric power source.

A plurality of lamps can be provided to each lamp unit of the liquid crystal display device, based on the size of the liquid crystal display device. If each of the lamp units 161 and 162 has two lamps, the number of power supply lines must be increased two times. That is, when there are two lamps disposed at each of two sides of the light guide plate 152, the power supply lines extending from each of the lamp units 161 and 162 respectively have two high voltage power supply lines 163 and 163a and two low voltage power supply lines 164 and 164a, as shown in FIG. 3.

The low voltage power supply lines and the high voltage power supply lines connected to both ends of each lamp are connected to a corresponding connector. The connector is connected with a connector of the inverter (not shown) mounted on a rear portion of the mold frame 132 to receive the power source. A shrinkable tube 167 wraps portions of the power supply lines 163, 163a, 164 and 164a extending out of the lamp units so that the power supply lines 163, 163a, 164 and 164a are prevented from interfering the assembly of the liquid crystal display device. From use of the shrinkable tube 167, the high voltage power supply lines 163 and 163a and the low voltage power supply lines 164 and 164a come in close contact with one another, as shown in FIG. 4, causing several problems. For example, power is leaked from the power supply lines due to coupling. That is, the power needed to operate the lamps needs to be increased. When power applied to the lamps is increased, the lamps tend to flicker. And, the overall consumption of power in using the liquid crystal display device increases due to the above-mentioned problems. Further, the above problems are more apparent when the liquid crystal display device is used in a low temperature environment, requiring a higher starting voltage and electric current.

SUMMARY OF THE INVENTION

The present invention solves the aforementioned problems, and accordingly it is the object of the present invention to provide a light source device capable of minimizing leakage of power provided to a lamp for generating light in a liquid crystal display device.

To achieve the above object, a light source device for use in a liquid crystal display device according to the present invention comprises: a light generating section for generating light; a power supply section for supplying power to the light generating section and a plurality of power supply lines for supplying the power source to the light generating section, which electrically connects the power supply section to the light generating section. Members for preventing leakage of power are formed on the power supply lines to prevent the power source provided from the light generating section from being leaked from the plurality of the power supply lines, which is mounted around the power supply lines. Preferably, these members include shrinkable tubes for wrapping the power supply lines.

According to a second aspect of the present invention, a liquid crystal display device according to the present invention comprises: a light generating section for generating light; a light guide plate for guiding the light to an image displaying section for displaying an image; a receptacle for receiving the light generating section and the light guide plate; and a power supply section for supplying a power supply to the light generating section, which is mounted in the receptacle. The light generating section receives the power source through a plurality of power supply lines connecting the power supply section to the light generating section. Members for reducing leakage of power are formed on the power supply lines to minimize or prevent the power provided to the light generating section from being leaked from the power supply lines.

The members for preventing the leakage of the power source are respectively coated on each power supply line so that the power supply lines are spaced apart from one another and each power supply line is a first power supply line for supplying a higher potential voltage to the light generating section and a second power supply line for supplying a lower potential voltage to the light generating section.

The plurality of the power supply lines includes at least two first power supply lines for supplying a high voltage to the light generating section and at least two second power supply lines for supplying a low voltage to the light generating section, and the two first power supply lines are respectively coated with the members for reducing the leakage of power to be spaced apart from each other and the two second power supply lines are together coated with the other members for minimizing the leakage of power.

The liquid crystal display device further comprises members for fixing the power supply lines to the receptacle to prevent separation of the power supply lines from the receptacle while guiding the power supply lines having the members for reducing leakage of power to the power supply section, which is formed on the receptacle. The members for reducing the leakage of power has connection members formed at a predetermined portion to connect the power supply lines to the fixing members.

According to the light source device and the liquid crystal display device of the present invention, the two first power supply lines for applying the higher potential voltage are spaced at a predetermined distance from each other. Accordingly, it is possible to reduce consumption of a power when a lamp is started and when the lamp is operating.

A light source device for a liquid crystal display device is also provided which includes: light generating means for generating light; power supply means for supplying power to the light generating means; a plurality of power supply lines for supplying power from the power supply means to the light generating means; and a shrinkable tube wrapped around the power supply lines for reducing power from being leaked from the plurality of the power supply lines.

According to an aspect of the present invention, the power supply lines include at least a first line for carrying a higher potential voltage and at least a second line for carrying a lower potential voltage, the first line being coated by material having a higher dielectric constant than material coating the second line.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF PREFERRED EMBODIMENTS

Hereinafter, preferred embodiments of the present invention will be described in detail with reference to the accompanying drawings.

Figure 1:
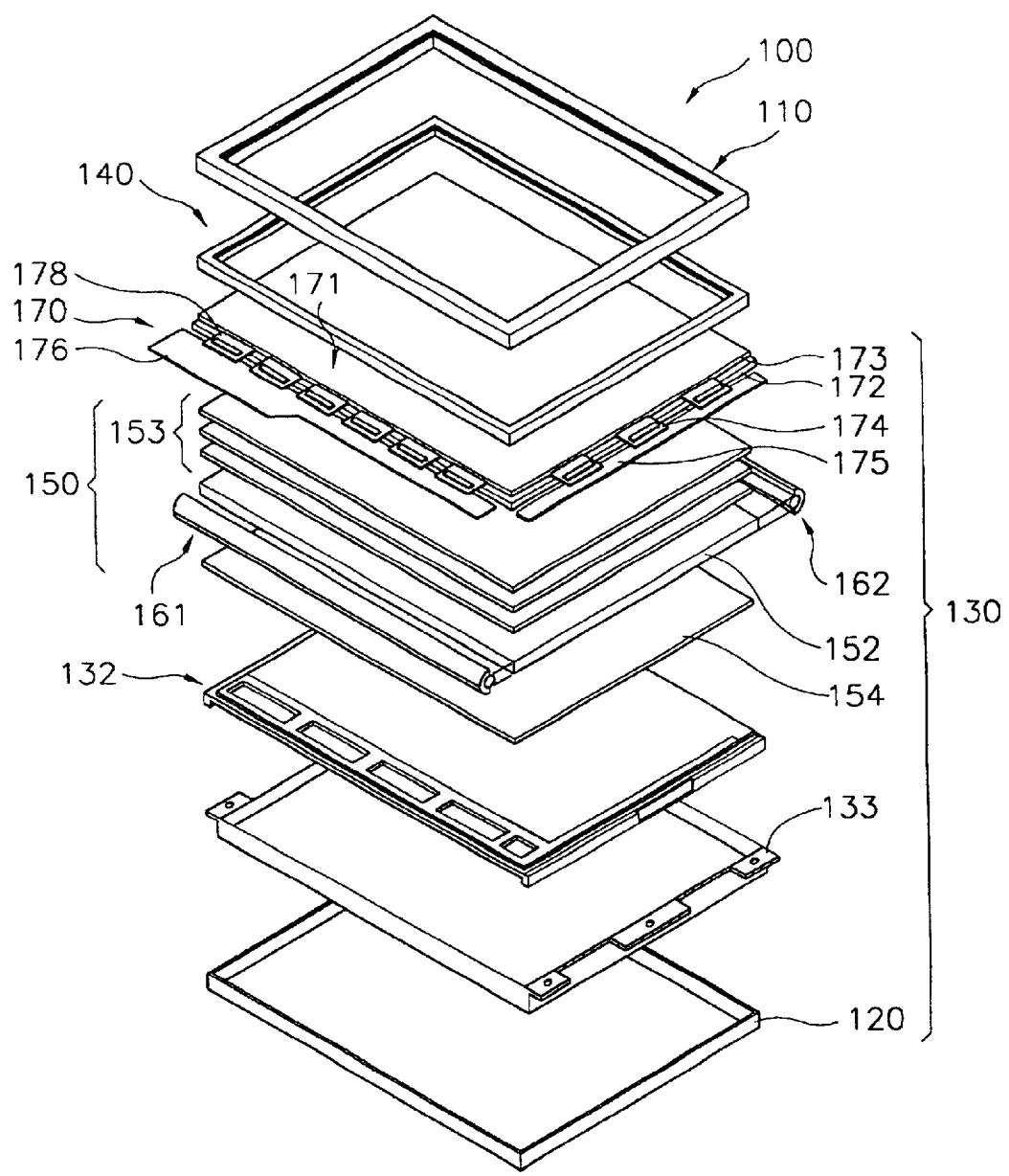
FIG. 1 is an exploded perspective view showing a conventional liquid crystal display device.
Figure 2:
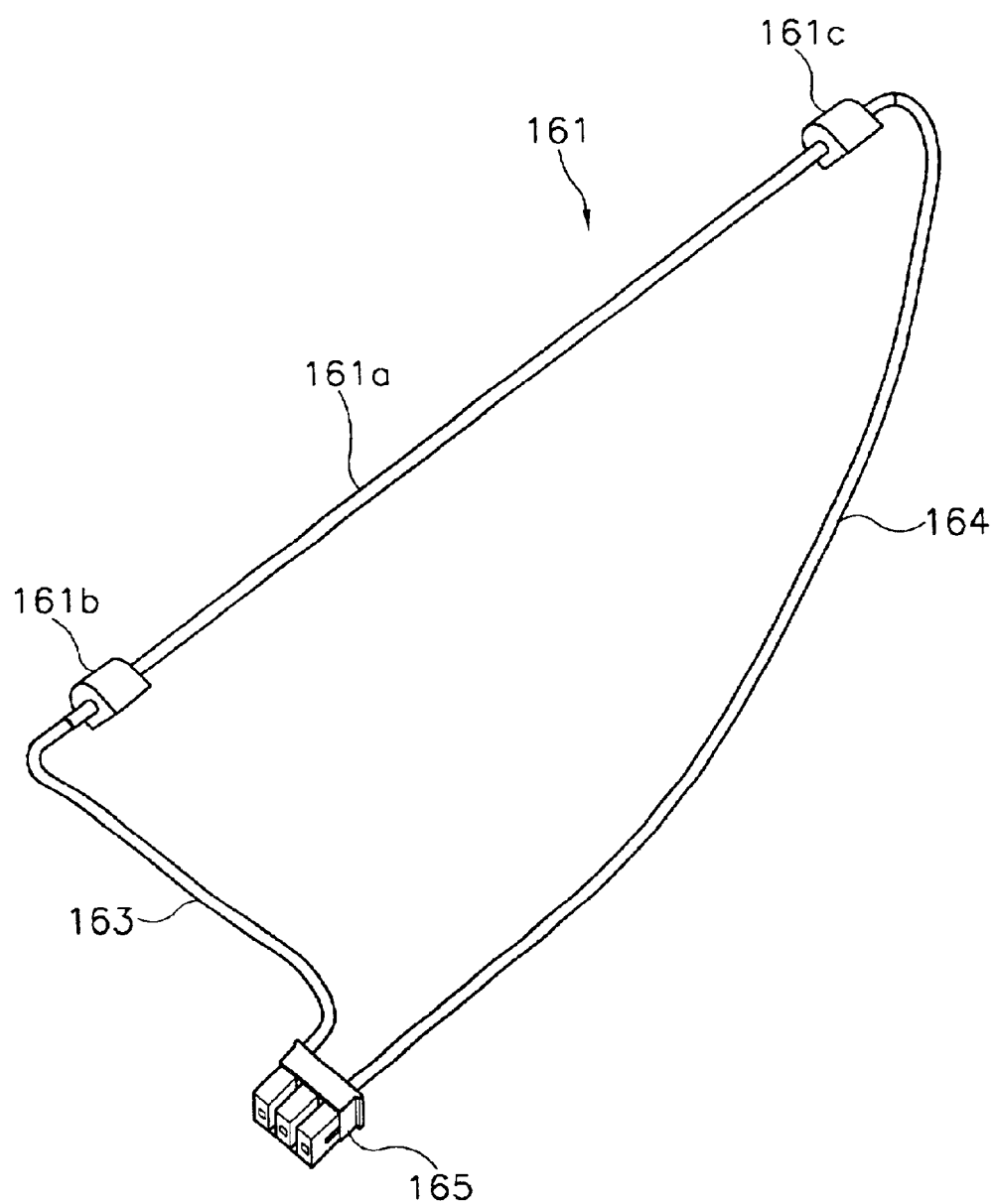
FIG. 2 shows a construction of a lamp adapted to a lamp unit shown in FIG. 1.
Figure 3:
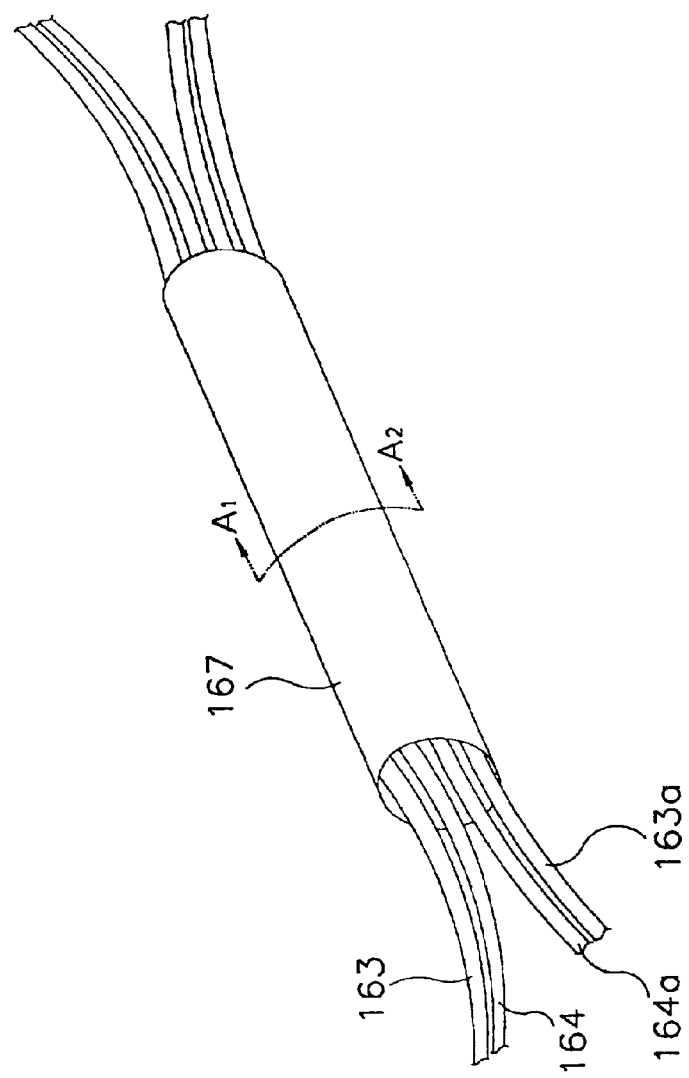
FIG. 3 is a perspective view showing electric supply lines and a shrinkable tube.
Figure 4:
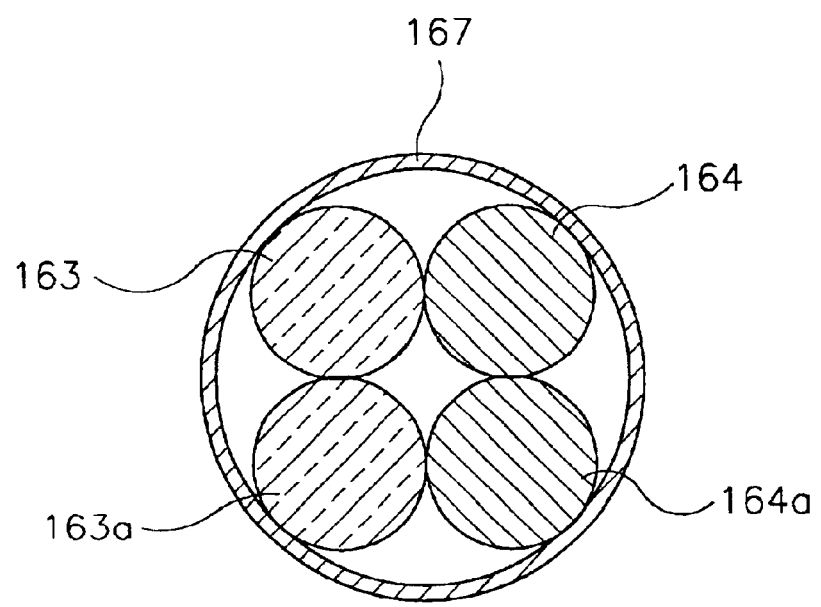
FIG. 4 is a sectional view showing the electric supply lines, taken along the line A1–A2 in FIG. 3.
Figure 5:
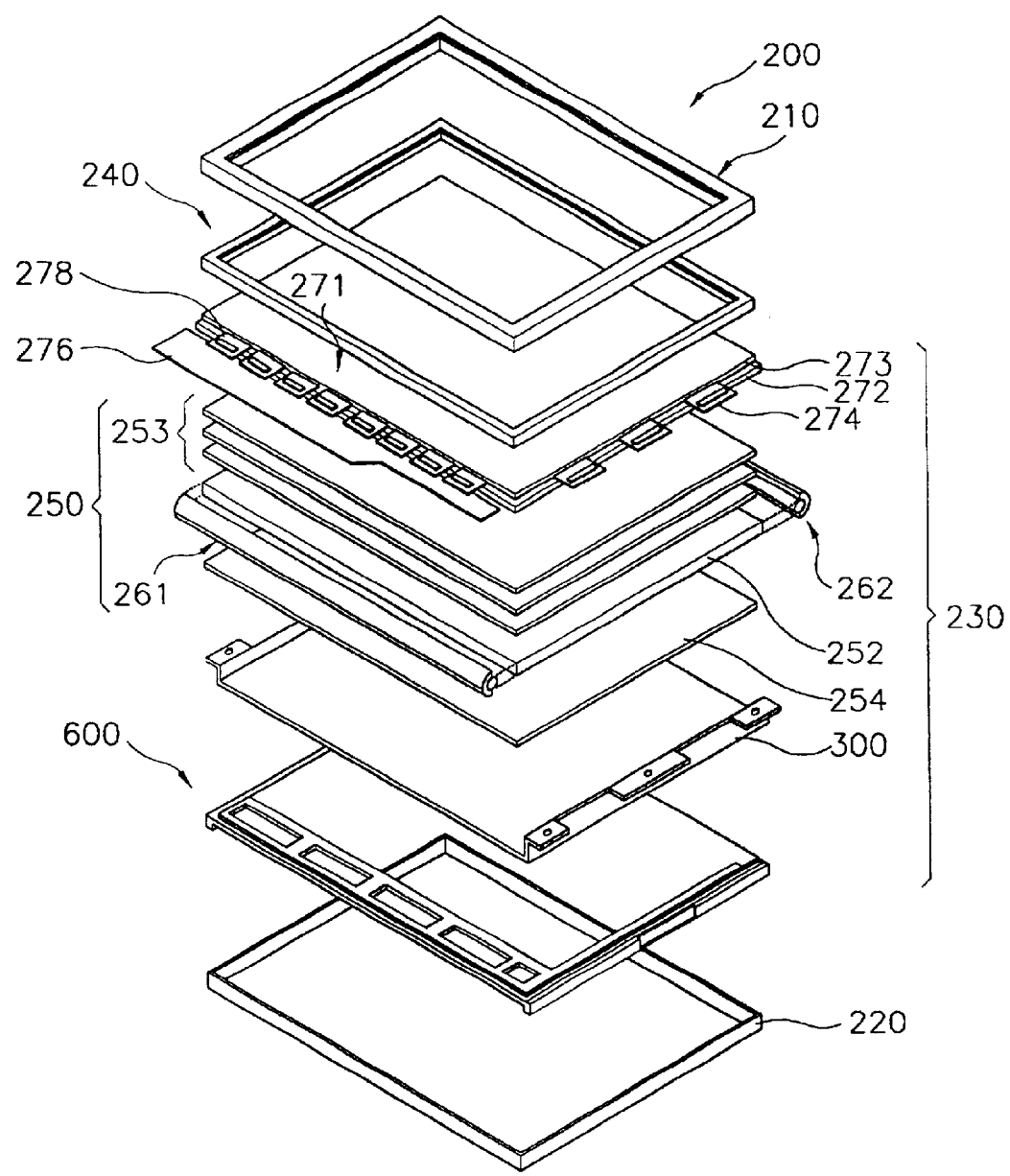
FIG. 5 is an exploded perspective view showing a liquid crystal display device according to a preferred embodiment of the present invention.

FIG. 5 is an exploded perspective view showing a liquid crystal display device according to a preferred embodiment of the present invention.

Referring to FIG. 5, the liquid crystal display device 200 includes a liquid crystal display module 230 for displaying an image when an image signal is applied thereto. A front case 210 and a rear case 220 receive the liquid crystal display module 230 therebetween.

The liquid crystal display module 230 includes a display unit 270 having a liquid crystal display panel 271 for displaying the image and a backlight assembly 250 for providing light to the display unit 270. A printed circuit board 276 (hereinafter referred to as "integrated PCB") contains components for operating the liquid crystal display panel 271. Signals are sent to the display unit 270 via a data tape carrier package 278 and a gate tape carrier package 274.

The liquid crystal display panel 271 comprises a thin film transistor substrate 272, a color filter substrate 273 and liquid crystals (not shown) between the thin film transistor substrate 272 and the color filter substrate 273. The thin film transistor substrate 272 is a transparent glass substrate on which thin film transistors are formed in a matrix. A data line is connected to the source terminals of the thin film transistors and a gate line is connected to a respective gate terminal of the thin film transistors. Furthermore, pixel electrodes made of Indium Tin Oxide (ITO) as a transparent and conductive material is formed at drain terminals of the thin film transistors.

When signals are applied to the data line and the gate line, the signals are input to the source terminal and the gate terminal of the respective thin film transistor. As the signals are input to the thin film transistors, the thin film transistors are respectively turned-on or turned-off to cause respective liquid crystals to pass or block light.

The color filter substrate 273 is provided to face the thin film transistor substrate 272. The color filter substrate 273 has RGB pixels which are formed by a thin film process to present desired colors when light passes through the color filter substrate 273. A surface of the color filter substrate 273 is covered with a common electrode made of the ITO.

When a power source is applied to the gate and source terminals of transistors on the thin film transistor substrate 272 to turn on the thin film transistor, an electric field is created between the pixel electrodes and common electrodes of the color filter substrate 273. This electric field changes the array angle of the liquid crystals disposed between the thin film transistor substrate 272 and the color filter substrate 273.

Control signals such as driving signals and timing signals are applied to the gate lines and data lines of the thin film transistors to control the amount of voltage applied at specified times to the liquid crystals in the liquid crystal display panel 271 to control the level of brightness affecting each pixel.

The data tape carrier package 278 shown in FIG. 5 is preferably a flexible circuit board. It is attached to the source portion of the liquid crystal display panel 271 and data driving signals are applied at appropriate times. The gate tape carrier package 274 is attached to the gate portion of the liquid crystal display panel 271 for application of gate driving signals.

The integrated PCB 276, which respectively applies the driving signals to the gate lines and the data lines as soon as the image signals are received from outside of the liquid crystal display panel 271, makes contact with the data tape carrier package 278 and the data lines of the liquid crystal display panel 271. A source portion is formed on the integrated PCB 276 to receive the image signals from an information process device (not shown) such as a computer, etc. and then to provide the data driving signals to the liquid crystal display panel 271. Furthermore, a gate portion is formed on the integrated PCB 276 to provide the gate driving signals to the liquid crystal display panel 271.

That is, the integrated PCB 276 generates the gate driving signals and the data signals for driving the liquid crystal display device and the plural timing signals for applying the gate driving signals and the data signals at a proper time, so as to apply the gate driving signals through the gate tape carrier package 274 to the gate lines of the liquid crystal display panel 271 and the data signals through the data tape carrier package 278 to the data lines of the liquid crystal display panel 271. Alternatively, a printed circuit board including only the source portion and the gate portion or solely the gate portion of the integrated PCB 276 may also be used to connect to the gate tape carrier package 274 or only the source portion is formed on the integrated PCB 276 and connected to the data tape carrier package 278.

A backlight assembly 250 is disposed under the display unit 270 to uniformly supply light to the display unit 270. The backlight assembly 250 includes first and second lamp units 261 and 262 as light source. Each of the lamp units 261 and 262 has two lamps. Preferably, a cold cathode fluorescent lamp is used.

The light guide plate 252 is a size corresponding to that of the liquid crystal display panel 271 of the display unit 270. It is disposed under the liquid crystal display panel 271 so as to guide the light from the first and second lamp units 261 and 262 to the display unit 270. A plurality of optical sheets 253 is disposed on the light guide plate 252 to redirect and evenly scatter the light from the light guide plate 252 to the liquid crystal display panel 271. Furthermore, a light reflecting plate 254 is provided under the light guide plate 252 to reflect the light directed away from the display unit to enhance light efficiency.

The display unit 270 and the backlight assembly 250 are received in a bottom chassis 300 that is used as a receptacle and supported by a mold frame 600. The mold frame 600 has an opening at a bottom surface thereof for receiving a rear surface of the bottom chassis 300 to be exposed out of the mold frame 600. In addition, some portions of the mold frame 600 are opened so that the circuit elements of the integrated PCB 276 are easily received in the mold frame 600 when the integrated PCB 276 is bent and contained in the mold frame 600.

An inverter PCB (hereinafter referred to as "inverter board") supplies power and an A/D PCB (hereinafter referred to as an "A/D board") converts analog to digital signals are mounted on the rear surface of the bottom chassis 300, which is exposed out of the mold frame 600. The inverter board (not shown) is connected to the power source. It outputs a predetermined level of voltage to the first and second lamp units 261 and 262. The A/D board (not shown) is connected to the integrated PCB 276, which converts data signals, e.g., analog to digital before they are sent to the liquid crystal display device 271.

The top chassis 240 and the bottom chassis 300 act to house the display unit 270 therebetween. The top chassis 240 causes the integrated PCB 276 to bend and expose outside of the mold frame 600. Then, the front case 210 is integrated with the rear case 220 to complete assembly of the liquid crystal display device.

Figure 6:
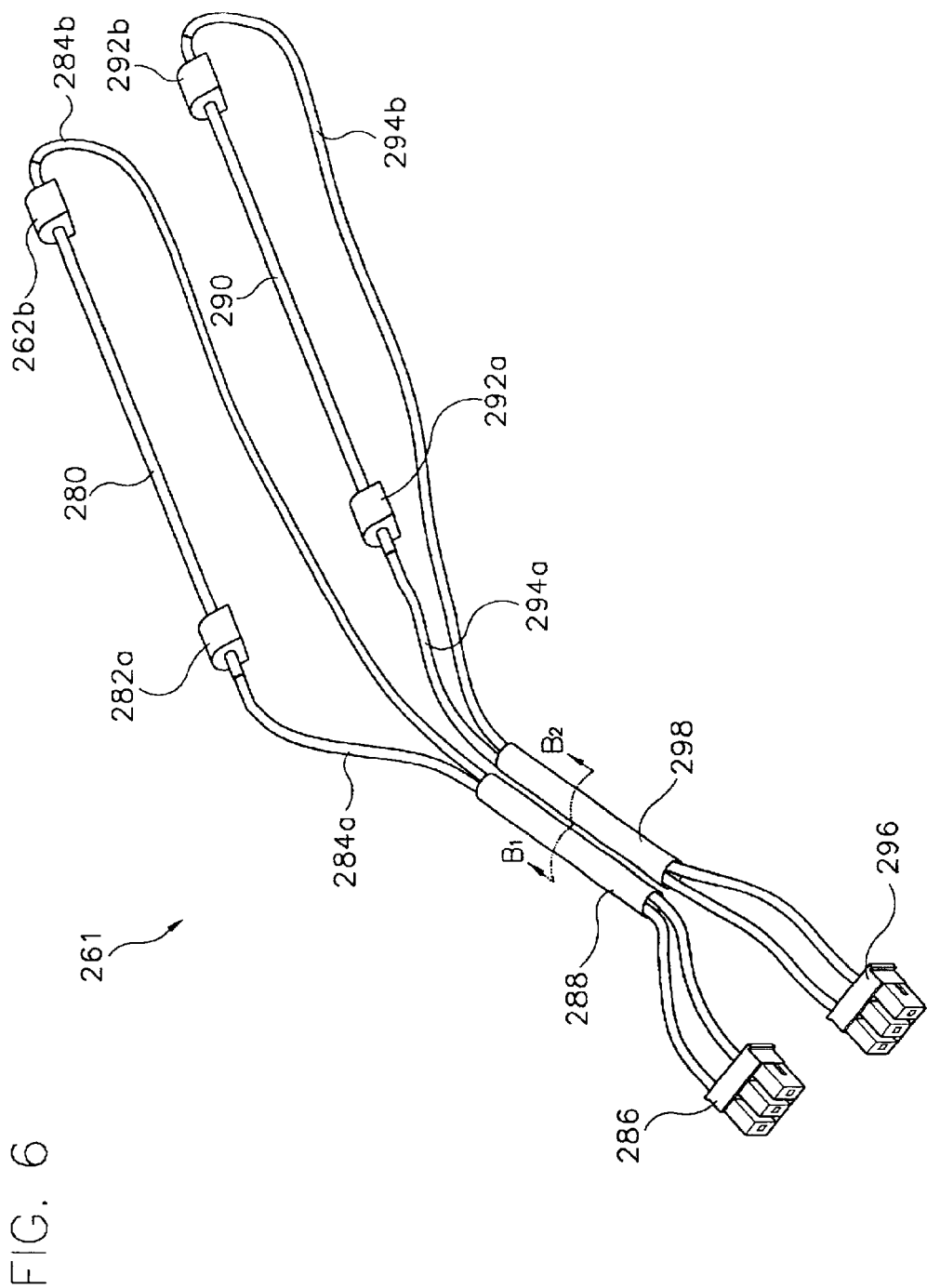
FIG. 6 is a perspective view showing a construction of a lamp adapted to a lamp unit according to an embodiment of the present invention.
Figure 7:
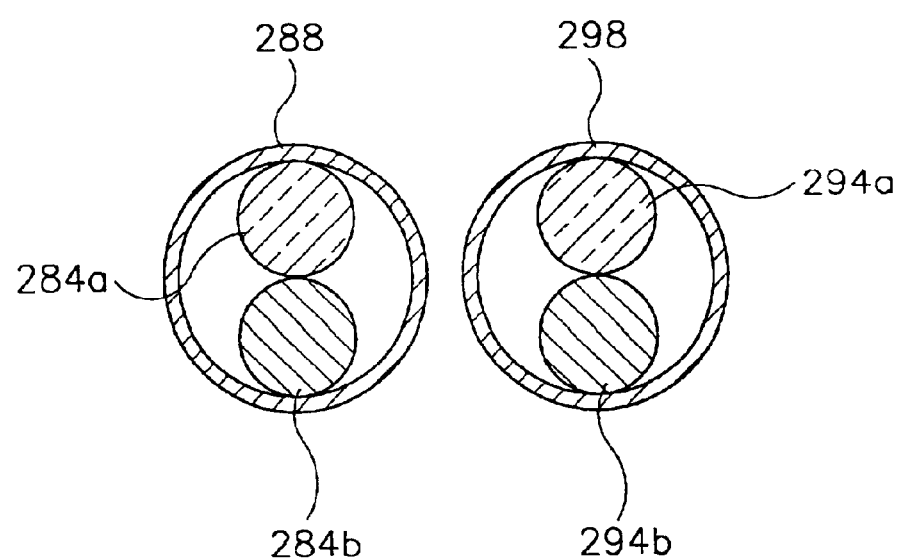
FIG. 7 is a sectional view showing electric supply lines, taken along the line B1–B2 in FIG. 6.

FIG. 6 is a perspective view showing a construction of a lamp adopted to a lamp unit according to a preferred embodiment of the present invention and FIG. 7 is a sectional view of the electric supply lines, taken along line B1–B2 in FIG. 6. Although the lamp unit is described as having two lamps, it is understood that the present invention is applicable to each of the lamp units having more than at least two lamps.

As shown in FIG. 6, first and second lamps 280 and 290 are disposed in a lamp cover of the first lamp unit 261. Lamp holders 282a, 282b, 292a and 292b are mounted at both ends of the first and second lamps 280 and 290 for positioning the first and second lamps 280 and 290. Both a set of lamp holders 282a and 292a and the other set of lamp holders 282b and 292b are integrally formed.

First and second power supply lines 284a and 284b are respectively connected to each end of the first lamp 280 to supply power from the inverter board (not shown) to the first lamp 280. The first power supply line 284a supplies the higher potential voltage to the first lamp 280 and the second power supply line 284b supplies the lower potential voltage or ground to the first lamp 280. The other ends of the first and second power supply lines 284a and 284b are connected to a first connector 286 which receives power from the inverter board.

Similarly, third and fourth power supply lines 294a and 294b are connected to each end of the second lamp 290 to supply power from the inverter board to the second lamp 290. The third power supply line 294a supplies the higher potential voltage to the second lamp 280 and the fourth power supply line 294b supplies the lower potential voltage or ground to the second lamp 290. The other ends of the third and fourth power supply lines 294a and 294b are connected to a second connector 296, which receives power from the inverter board. The power supply lines 284a, 284b, 294a and 294b are preferably made of wires having high conductivity and are thin coated with an insulation material.

Meanwhile, the first and second power supply lines 284a and 284b are inserted in a first shrinkable tube 288 to be wrapped in a bundle and the third and fourth power supply lines 294a and 294b are inserted in a second shrinkable tube 298 to be wrapped in a bundle. As shown in FIG. 7, when a pair of the first and third power supply lines 284a and 294a of the first and second lamps 280 and 290 is separated from a pair of the second and fourth power supply lines 284b and 294b by means of the first and second shrinkable tubes 288 and 298, the first power supply line 284a receiving the higher potential voltage is spaced from the third power supply line 294a, by at least the thickness of the insulators and the shrinkable tubes. In other words, a coupling phenomenon between the first and third power supply lines 284a and 294a is decreased, in comparison to the prior art approach wherein power supply lines 284a and 294a would have been wrapped together in one shrinkable tube.

As described above, the first, second, third and fourth power supply lines 284a, 284b, 294a and 294b wrapped with the first and second shrinkable tubes 288 and 298 extend from the first lamp unit 261 to the rear surface of the mold frame 600. That is, the first and second connectors 286 and 296 are connected to a connector of the inverter board contained in the mold frame 600 to receive the power source for starting and operating the first and second lamps 280 and 290.

Figure 8:
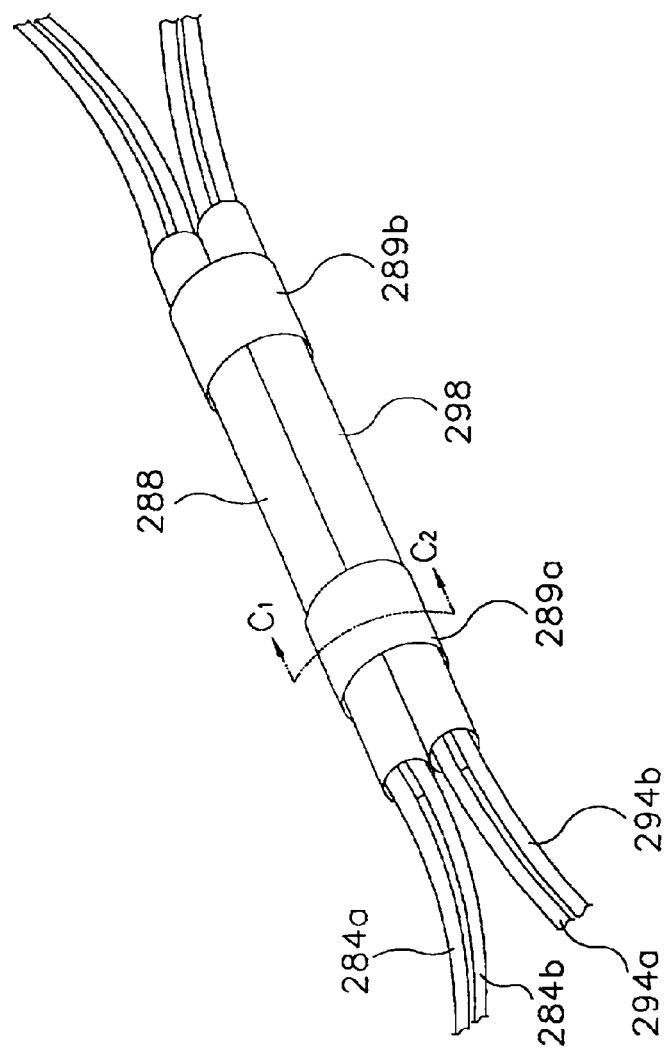
FIG. 8 is a perspective view showing the electric supply lines of FIG. 6, in which the electric supply lines are inserted in a fixing member to be fixed to a mold frame in FIG. 5.
Figure 9:
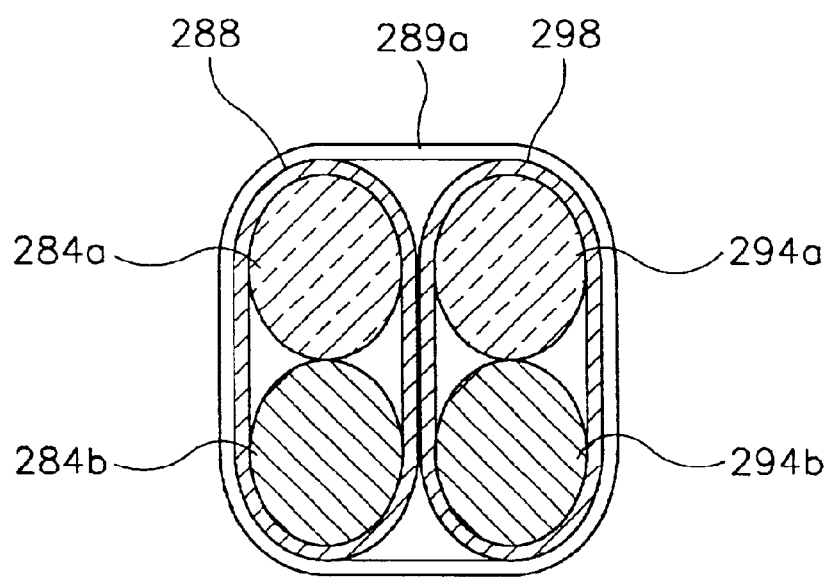
FIG. 9 is a sectional view showing the electric supply lines, taken along the line C1–C2 in FIG. 8.
Figure 10:
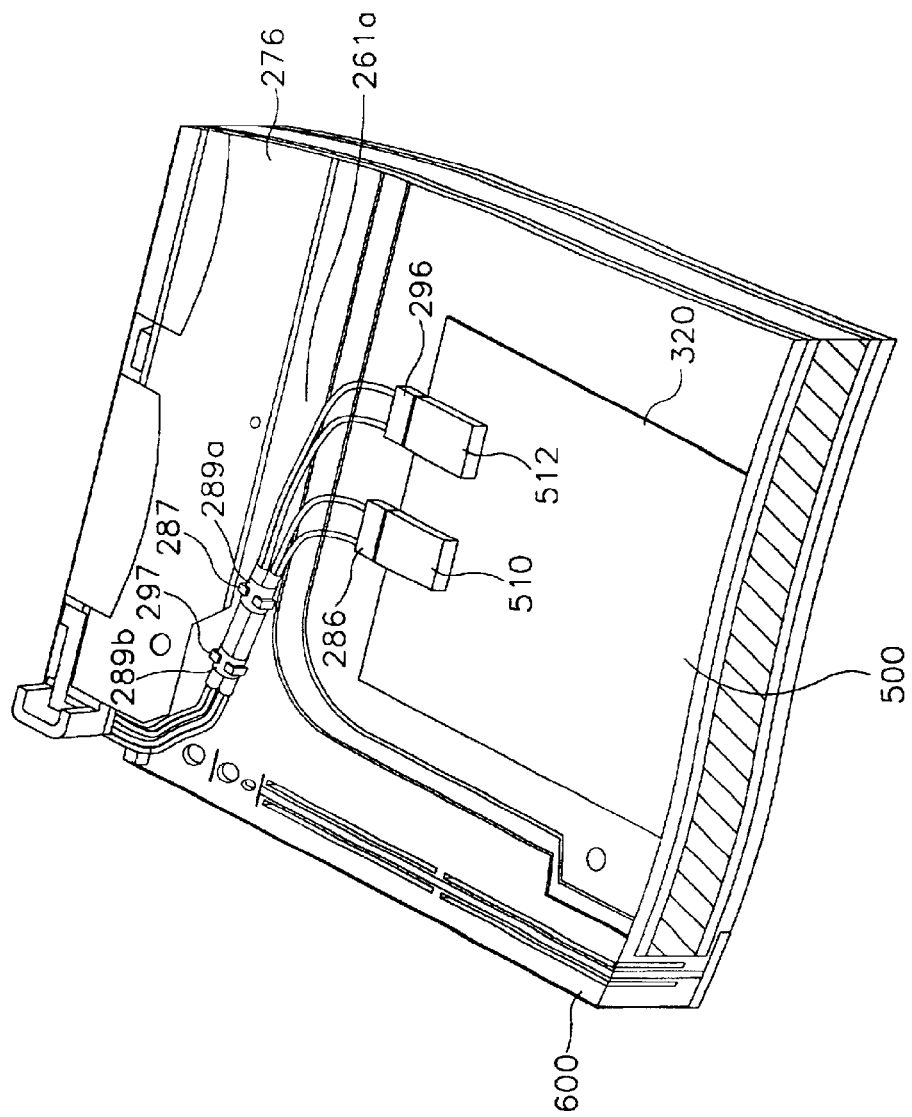
FIG. 10 is a perspective view showing the electric supply lines fixed to the mold frame in FIG. 5.
Figure 11:
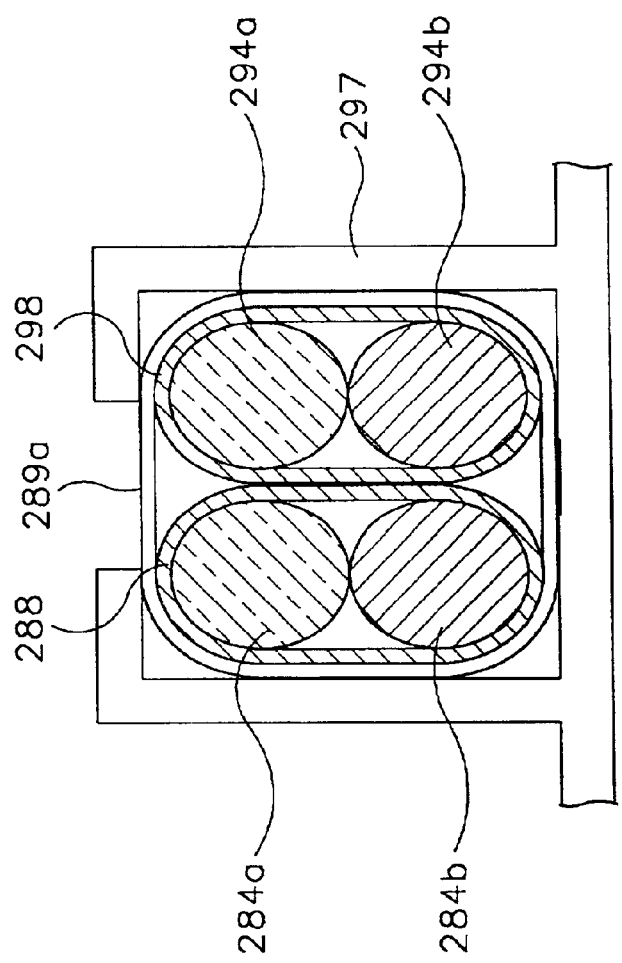
FIG. 11 is a sectional view showing the electric supply lines fixed to a back surface of the mold frame.

FIG. 8 is a perspective view showing the electricity supply lines of FIG. 6, in which the power supply lines are inserted in a fixing member to be fixed to a mold frame in FIG. 5. FIG. 9 is a sectional view showing the electric supply lines, taken along the line C1–C2 in FIG. 8. FIG. 10 is a perspective view showing the power supply lines fixed to the mold frame in FIG. 5. FIG. 11 is a sectional view showing the power supply lines fixed to a rear surface of the mold frame.

Referring to FIGS. 8 to 11, the first and second shrinkable tubes 288 and 298 are fastened by means of first and second combination members 289a and 289b formed at a predetermined distance thereon to facilitate fixing of the first, second, third and fourth power supply lines 284a, 284b, 294a and 294b to the rear surface of the mold frame 600. That is, the first, second, third and fourth power supply lines 284a, 284b, 294a and 294b divided into the two pairs of the power supply lines by means of the first and second shrinkable tubes 288 and 298 are integrated in a bundle by means of the first and second combination members 289a and 289b. This facilitates the fixing of the first, second, third and fourth power supply lines 284a, 284b, 294a and 294b to fixing projections 287 and 297, which have a hook shape as shown in FIG. 11.

It is to be appreciated that the number of the first and second combination members 289a and 289b used do not have to correspondence with the number of the fixing projections 287 and 297 formed on the rear surface of the mold frame 600.

Referring to FIG. 10, the inverter board 500 is mounted on the rear surface of the mold frame 600, which has third and fourth connectors 510 and 512 installed at one end thereof. The inverter board 500 receives and converts the power source at a desired level of the voltage before the power source is supplied to the first and second lamp units 261 and 262 and the other circuit elements in the liquid crystal display device. The power source is supplied through the third and fourth connectors 510 and 512 and the first and second connector 286 and 296 to the first and second lamps 280 and 290.

The first and second fixing projections 287 and 297 are integrally formed at a predetermined distance from each other on the mold frame 600 between the first lamp unit 261 and the inverter board 500. The first, second, third and fourth power supply lines 284a, 284b, 294a and 294b, which are extended from the first lamp unit 261 to the inverter board 500, are fixedly inserted in a space between the first and second fixing projections 297 and 287.

As shown in FIG. 11, parts of the first and second shrinkable tubes 288 and 298 inserted in the space between the first and second fixing projections 287 and 297 are fastened by the first and second combination members 289a and 289b so that the first, second, third and fourth power supply lines 284a, 284b, 294a and 204b are tied up in the bundle.

If the first, second, third and fourth power supply lines 284a, 284b, 294a and 204b are not tied up in the bundle by means of the first and second combination members 289a and 289b, two pairs of the power supply lines, for examples one pair of the first and third power supply lines 284a and 294a and the other pair of the second and fourth power supply lines 284b and 294b which are divided by means of the first and second shrinkable tubes 289a and 289b, are respectively and fixedly inserted in the space between the first and second fixing projections 287 and 297. Especially, since the first and second fixing projections 287 and 297 are formed in a hook shape, the bundle of the first, second, third and fourth power supply lines 284a, 284b, 294a and 204b is prevented from being separated from the space between the first and second fixing projections 287 and 297 during the assembling of the liquid crystal display device.

Figure 12:
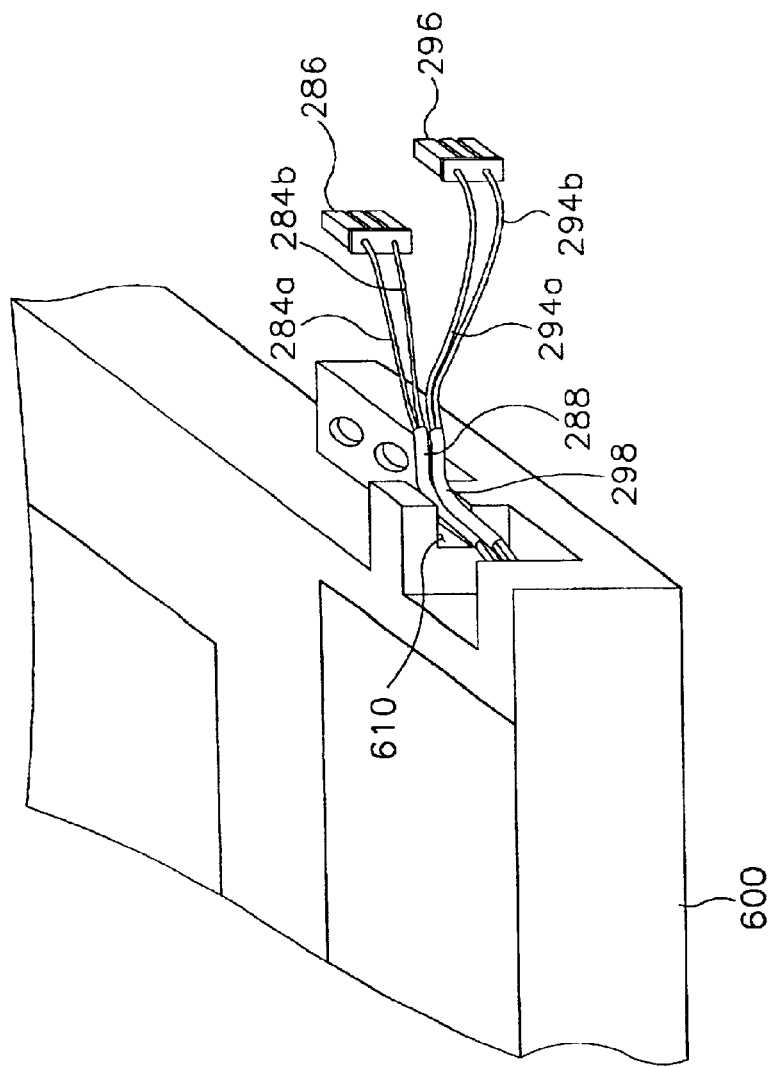
FIG. 12 is a view showing the electric supply lines fixed to the mold frame according to another embodiment of the present invention.

Meanwhile, the first and second fixing projections 287 and 297 integrally formed on the mold frame 600 can be substituted by a channel as shown in FIG. 12. FIG. 12 is a view showing the electric supply lines, shown in FIG. 6, which are fixed to the mold frame according to another embodiment of the present invention.

Referring to FIG. 12, the channel 610 is formed at a portion of a side wall of the mold frame 600 corresponding to the parts of the first, second, third and fourth power supply lines 284a, 284b, 294a and 204b extending from the first lamp unit 261. The first, second, third and fourth power supply lines 284a, 284b, 294a and 204b coated with the first and second shrinkable tubes 288 and 298 are inserted in the channel 610. As shown in FIG. 10, the first, second, third and fourth power supply lines 284a, 284b, 294a and 204b extend to the inverter board 500 for the first and second connectors 286 and 296 to be connected to the third and fourth connectors 510 and 512.

When the first, second, third and fourth power supply lines 284a, 284b, 294a and 204b are inserted in the channel 610, the first, second, third and fourth power supply lines 284a, 284b, 294a and 204b are prevented from being separated from the mold frame 600 as the top chassis 240 is combined with the mold frame 600. Accordingly, it is not needed to integrally form the first and second combination members 289a and 289b on the first and second shrinkable tubes 288 and 298 to integrate the first, second, third and fourth power supply lines 284a, 284b, 294a and 204b in the bundle.

On the other hand, it is understood that the first, second, third and fourth power supply lines 284a, 284b, 294a and 204b can be tied up as three pairs of the power supply lines.

Figure 13:
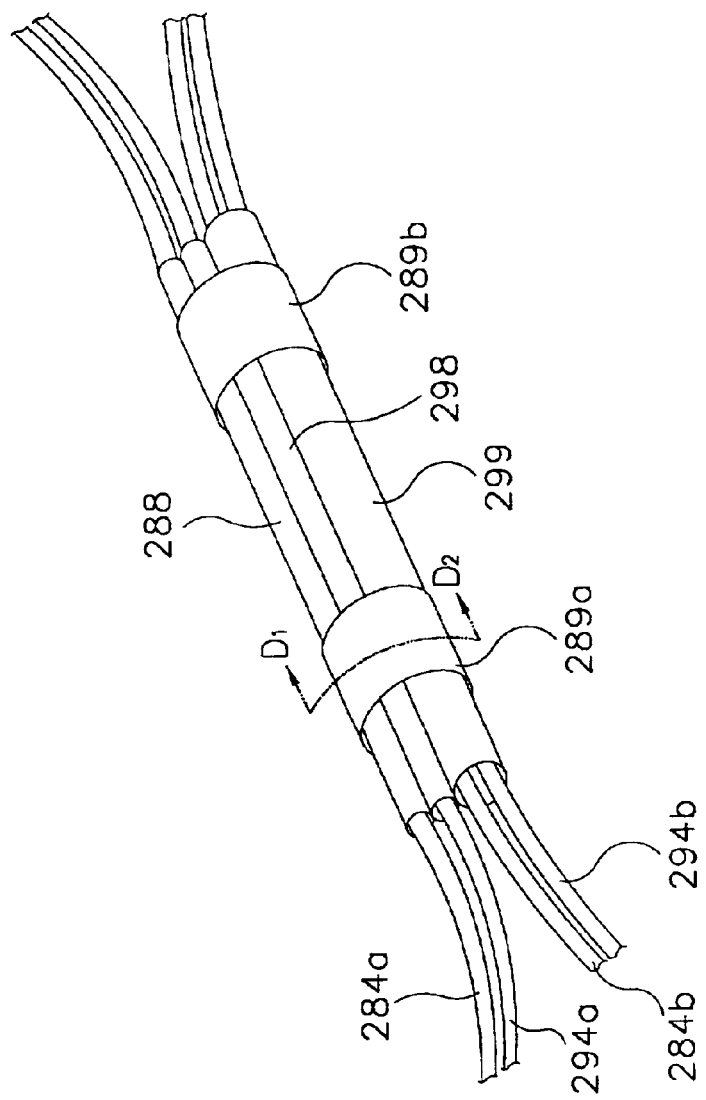
FIG. 13 is a perspective view showing a combination construction of an electric supply lines.
Figure 14:
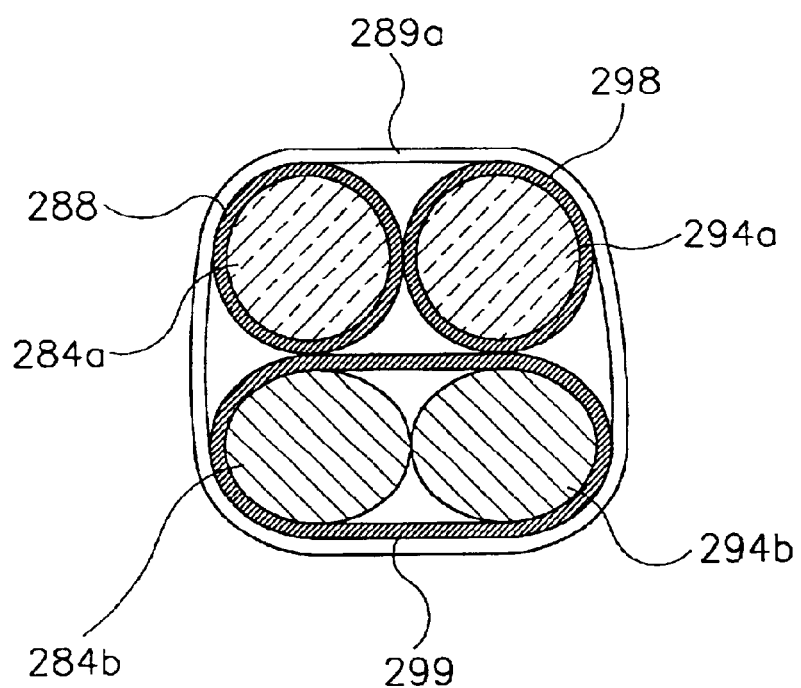
FIG. 14 is a sectional view showing the electric supply lines, taken along the line D1–D2 in FIG. 13.

FIG. 13 is a perspective view showing a combination construction of the power supply lines shown in FIG. 6 and FIG. 14 is a sectional view showing the power supply lines, taken along the line D1–D2 in FIG. 13. Relating to FIGS. 13 and 14, the same reference numerals are used to indicate the same elements as that shown in FIG. 6.

Referring to FIGS. 13 and 14, the first and third power supply lines 284a and 294a that apply the higher potential voltage to the first and second lamps 280 and 290 are respectively wrapped by and coated with the first and second shrinkable tubes 288 and 298. The second and fourth power supply lines 284b and 294b that respectively apply the lower potential voltage to the respective first and second lamps 280 and 290 are together coated with a third shrinkable tube 299.

In other words, the first and third power supply lines 284a and 294a are spaced apart from each other by means of the first and second shrinkable tubes 288 and 298 as similar as these of FIG. 9. Furthermore, the first and third power supply lines 284a and 294a are spaced apart from the second and fourth power supply lines 284b and 294b applying the lower potential voltage by means of the first, second and third shrinkable tubes 288, 298 and 299.

When the power supply lines for the higher potential voltage and the power supply lines for the lower potential voltage are separated from each other, the coupling phenomenon can be prevented.

As shown in FIGS. 13 and 14, the first and second combination members 289a and 289b are coated on the first, second and third shrinkable tubes 288, 298 and 299 dividing the first, second, third and fourth power supply lines 284a, 284b, 294a and 294b into three bundles. The first and second combination members 289a and 289b, which integrate the first, second, third and fourth power supply lines 284a, 284b, 294a and 294b in the bundle, perform to fixedly insert the first, second, third and fourth power supply lines 284a, 284b, 294a and 294b in the space between the fixing projections 287 and 297 that are formed on the rear surface of the mold frame 600 as shown in FIG. 10.

Meanwhile, to prevent the coupling phenomenon between the first, second, third and fourth power supply lines 284a, 284b, 294a and 294b, it is possible to change the material of coating the electric wires or to vary the lengths of the shrinkable tubes.

Preferably, according to another embodiment of the present invention, the second and fourth power supply lines 284b and 294b applying the lower potential voltage are substituted by coating material having a lower dielectric constant than the coating material of power supply lines 284a and 294a. It is found that the coupling phenomenon between the power supply lines can be more effectively prevented. It is also preferable to use shrinkable tubes having a dielectric constant that is different from the dielectric constant of the coating material of the power supply lines.

In addition, when the lengths of the first, second and third shrinkable tubes 288, 298 and 299 coated on the parts of the first, second, third and fourth power supply lines 284a, 284b, 294a and 294b are varied to extend to the rear surface of the mold frame 600, the capacitance between the first, second, third and fourth power supply lines 284a, 284b, 294a and 294b is changed. Therefore, the lengths of the first, second and third shrinkable tubes 288, 298 and 299 are changed to vary the capacitance between the first, second, third and fourth power supply lines 284a, 284b, 294a and 294b, thereby reducing the leakage of the power source according to the coupling phenomenon of the power supply lines.

Figure 15:
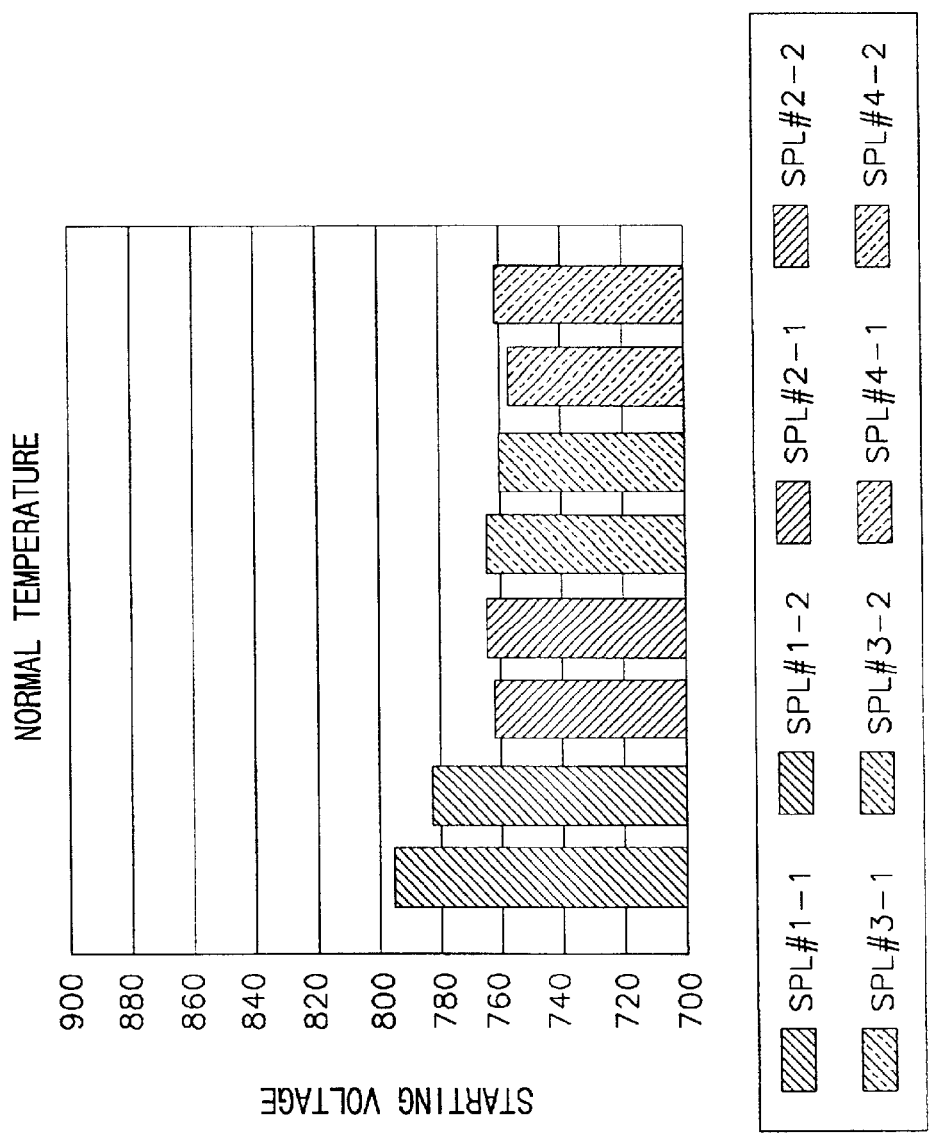
FIGS. 15 and 16 are graphs showing starting voltages of the lamp of the liquid crystal display device having the electric supply lines shown in FIG. 6.
Figure 16:
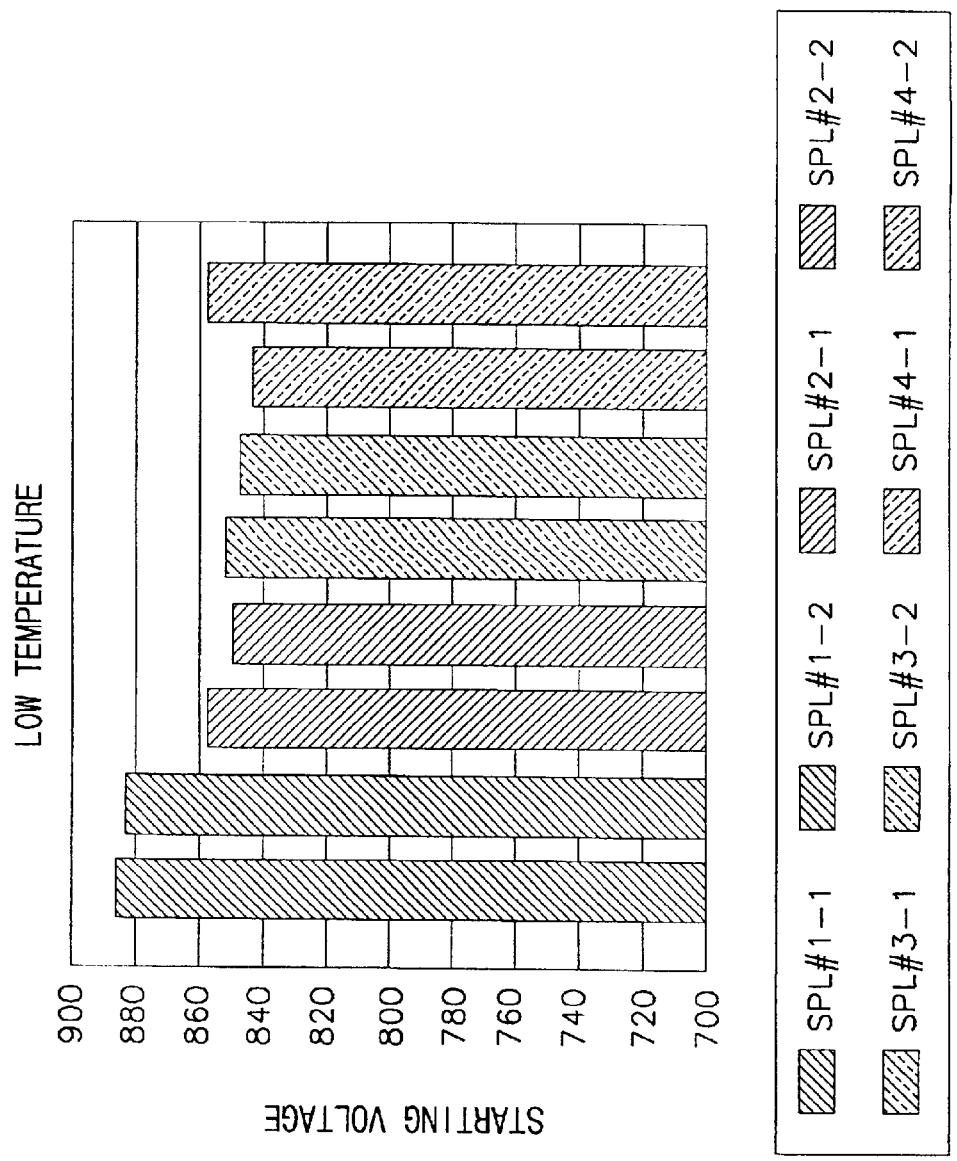

FIGS. 15 and 16 are graphs showing starting voltages of the lamp of the liquid crystal display device having the power supply lines shown in FIG. 6. Table 1 shows starting voltages of the lamp which are variable according to a change of the combination construction of the first, second, third and fourth power supply lines 284a, 284b, 294a and 294b, below.

TABLE 1

|  |  | Normal temperature | Low temperature (−5.0° C.) | |
| --- | --- | --- | --- | --- |
|  |  | (23.5° C.) Starting voltage (Vrms) | Starting voltage (Vrms) | Flickering starting current (mA) |
| Sample 1 | SLP #1-1 | 796 | 886 | 2.6 |
|  | SLP #1-2 | 783 | 883 | 2.8 |
|  | AVG. | 790 | 885 | 2.7 |
| Sample 2 | SLP #2-1 | 762 | 856 | 2.3 |
|  | SLP #2-2 | 764 | 853 | 2.1 |
|  | AVG. | 763 | 855 | 2.2 |
| Sample 3 | SLP #3-1 | 763 | 853 | 2.1 |
|  | SLP #3-2 | 760 | 849 | 2.4 |
|  | AVG. | 762 | 851 | 2.3 |
| Sample 4 | SLP #4-1 | 758 | 845 | 2.1 |
|  | SLP #4-2 | 761 | 857 | 2.2 |
|  | AVG. | 760 | 851 | 2.2 |

In table 1, the sample 1 shows the conventional power supply lines in which the first, second, third and fourth power supply lines 284a, 284b, 294a and 294b were integrated in a bundle by means of only the one shrinkable tube. The sample 2 shows the second and fourth power supply lines 284b and 294b for the lower potential voltage, which were made of a material having a lower dielectric constant than that of the sample 1. In this case, the shrinkable tube is made with material having a dielectric constant which is different from dielectric constant of the material used for coating the first, second, third and fourth power supply lines 284a, 284b, 294a and 294b. Also, the sample 3 shows the first, second, third and fourth power supply lines 284a, 284b, 294a and 294b of which the first and second power supply lines 284a and 284b were integrated in a bundle by means of the first shrinkable tube 288 and the third and fourth power supply lines 294a and 294b are integrated in a bundle by means of the second shrinkable tube 298. The sample 4 shows the first, second, third and fourth power supply lines 284a, 284b, 294a and 294b integrated in one bundle, of which the lengths of the first and second shrinkable tubes 288 and 298 were reduced from about 12 cm to about 5 cm. On the other hand, the test of measuring the voltage was performed for the two of the respective samples under the condition of the normal temperature of about 23.5° C. and the low temperature of −5.0° C.

Referring to FIGS. 15 and 16, and the table 1, the average values of the starting voltages of the samples 1, 2, 3 and 4 respectively were about 790, 763, 762 and 760 under the condition of the normal temperature. It may be noted that the sample 1 representing the conventional power supply lines has a relatively higher starting voltage than others. It is thus shown that the sample 1 requires a higher voltage than that of samples 2, 3 and 4 to start the lamp.

That is, since a large amount of the power source which supplies the power source from the inverter board to the lamp is leaked from the power supply lines according to the conventional art, higher starting voltage is required from the inverter board. In samples 2, 3 and 4, on the contrary, the leakages of the electric current from the first, second, third and fourth power supply lines 284a, 284b, 294a and 294b were less than that of sample 1. Accordingly, the starting voltage output from the inverter board is lower than that of the sample 1.

It is shown in the table 1 that the starting voltages of the samples 1, 2, 3 and 4 under the condition of lower temperature were higher than those under the condition of normal temperature, but the values of samples 2, 3 and 4 also were lower than that of sample 1. The values of the starting voltages in samples 1, 2, 3 and 4 respectively were about 885, 855, 851 and 851. This means that the changes of the material for the power supply lines, the distances between the power supply lines spaced from one another by means of the shrinkable tubes, and the changes of the coating lengths of the shrinkable tubes reduce the leakage of the power source from the first, second, third and fourth power supply lines 284a, 284b, 294a and 294b.

In table 1, the average values of the electric current of the lamps respectively are about 2.7, 2.2, 2.3 and 2.2 when the flickering of the lamps started. This means that a higher operating voltage is needed from the inverter board to remove the flickering of the lamps having the combination construction of the power supply lines such as that of the sample 1, in that the average value of the electric current in the sample 1 is higher than the samples 2, 3 and 4. In the other words, the lamps having the constructions of the power supply lines such as those of samples 2, 3 and 4 do not generate the flickering even with the lower lamp operating voltages than that of the lamp in the sample 1. As a result, it can be seen that the leakage of the power source is less in the combination constructions of the power supply lines of the samples 2, 3 and 4 than in the combination construction of the power supply line of sample 1.

According to the light source device and the liquid crystal display device as described above, the first and third power supply lines, which supply the higher potential voltage from the inverter board to the lamps, are separated by means of the first and second shrinkable tubes. On the other hand, the second and fourth power supply lines, which supply the lower potential voltage from the inverter board to the lamps, are respectively integrated with the first and third power supply lines by means of the first and second shrinkable tubes, or separately spaced apart from the first and third power supply lines by means of the third shrinkable tube.

Accordingly, leakage of the power source which is generated due to the coupling phenomenon between the first, second, third and fourth power supply lines is reduced. Furthermore, the power consumption when starting and operating the lamps are reduced and the liquid crystal display device can be stably operated, regardless of the temperature environment.

Although preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display device comprising:

a plurality of lamps that generates light;

an image display unit that receives the light to display an image using liquid crystal;

a light guide plate that guides the light to the image display unit;

a receiving member that receives the lamps and the light guide plate;

a power supply mounted in the receiving member, the power supply supplying power to the lamps;

a plurality of power supply lines that supplies the power to the and electrically connects the power supply to the lamps, the plurality of the power supply lines including at least two first power supply lines that supplies a high voltage to the lamps and at least two second power supply lines that supplies a low voltage to the lamps; and a first leakage reduction member wrapping around the first power supply lines, so as to reduce the power from being leaked from the first power supply lines.

2. The liquid crystal display device of claim 1, wherein the first leakage reduction member provides spacing to the power supply lines so that the first and second power supply lines are spaced apart from each other.

3. The liquid crystal display device of claim 1, wherein the two first power supply lines are coated with the first leakage reduction member to be spaced apart from each other and the two second power supply lines are coated with a second leakage reduction member.

4. The liquid crystal display device of claim 3, wherein the first leakage reduction member and the second leakage reduction member are partially coated on an exposed portion of the power supply lines out of the receiving member.

5. The liquid crystal display device of claim 1, further comprising a fixing member that fixes the plurality of the power supply lines to the receiving member to prevent the power supply lines from being separated from the receiving member while guiding the plurality of the power supply lines having the first leakage reduction member to the power supply on the receiving member.

6. The liquid crystal display device of claim 5, wherein the first leakage reduction member has a connection member formed at a predetermined portion of the first leakage reduction member to connect the power supply lines to the fixing member.

7. The liquid crystal display device of claim 1, wherein the receiving member receiving the lamps comprises a mold frame, the mold frame having at least a portion that receives at least one circuit element of the liquid crystal display device.

8. The liquid crystal display device of claim 7, wherein the portion comprises a space that receives the at least one circuit element.

* * * * *